United States Patent
Ribarich et al.

(10) Patent No.: US 9,578,692 B2
(45) Date of Patent: Feb. 21, 2017

(54) POWER CONVERTER WITH TANK CIRCUIT AND OVER-VOLTAGE PROTECTION

(71) Applicant: Infineon Technologies Americas Corp., El Segundo, CA (US)

(72) Inventors: Thomas J. Ribarich, Laguna Beach, CA (US); Jorge Cerezo, Palos Verdes Peninsu, CA (US); Ajit Dubhashi, Redondo Beach, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 408 days.

(21) Appl. No.: 13/860,880

(22) Filed: Apr. 11, 2013

(65) Prior Publication Data

US 2013/0277362 A1  Oct. 24, 2013

Related U.S. Application Data

(60) Provisional application No. 61/652,091, filed on May 25, 2012, provisional application No. 61/635,664, filed on Apr. 19, 2012.

(51) Int. Cl.
  *H02H 7/122* (2006.01)
  *H05B 6/06* (2006.01)
  *H05B 6/12* (2006.01)

(52) U.S. Cl.
  CPC ............ *H05B 6/062* (2013.01); *H05B 6/1209* (2013.01)

(58) Field of Classification Search
  CPC ..................................................... H05B 6/062
  USPC ............... 323/282; 363/48, 90, 56.01–56.05, 363/125–127, 173
  See application file for complete search history.

(56) References Cited

U.S. PATENT DOCUMENTS

| | | | | |
|---|---|---|---|---|
| 3,611,195 A | * | 10/1971 | Parham et al. | 332/135 |
| 3,970,894 A | * | 7/1976 | Yasuda et al. | 315/370 |
| 4,150,411 A | * | 4/1979 | Howell | 361/45 |
| 5,239,255 A | * | 8/1993 | Schanin et al. | 323/237 |
| 5,912,549 A | * | 6/1999 | Farrington et al. | 323/207 |
| 8,049,481 B2 | * | 11/2011 | Li et al. | 323/283 |
| 8,279,631 B2 | * | 10/2012 | Yang | 363/20 |
| 8,629,660 B2 | * | 1/2014 | Nalbant | 323/222 |
| 8,755,203 B2 | * | 6/2014 | Li et al. | 363/21.16 |
| 9,118,252 B2 | * | 8/2015 | Inukai | |
| 9,142,947 B2 | * | 9/2015 | Hosotani | |

(Continued)

OTHER PUBLICATIONS

Jorge Cerezo, *IGBT Definition for Single Ended Induction Heating Cookers, Cooking with Induction Heating Technology*, Bodo's Power Systems, Electronics in Motion and Conversion (www.bodospower.com), Apr. 2012, pp. 22-30.

(Continued)

*Primary Examiner* — Adolf Berhane
*Assistant Examiner* — Nusrat Quddus
(74) *Attorney, Agent, or Firm* — Slater Matsil, LLP (57) ABSTRACT

In one implementation, a power converter with over-voltage protection includes a power switch coupled to a power supply through a tank circuit, and a control circuit coupled to a gate of the power switch. The control circuit is configured to turn the power switch OFF based on a current from the tank circuit, thereby providing the over-voltage protection to the power converter. In one implementation, the power converter is a class-E power converter. In one implementation, the control circuit is configured to sense the current from the tank circuit based on a voltage drop across a sense resistor coupled to the power switch.

21 Claims, 6 Drawing Sheets

(56) References Cited

U.S. PATENT DOCUMENTS

| | | | |
|---|---|---|---|
| 2006/0290337 A1* | 12/2006 | Lhermite et al. | 323/316 |
| 2010/0002480 A1* | 1/2010 | Huynh et al. | 363/90 |
| 2010/0033136 A1* | 2/2010 | Yang | 320/140 |
| 2010/0066337 A1* | 3/2010 | Gong et al. | 323/285 |
| 2012/0049823 A1* | 3/2012 | Chen | 323/282 |
| 2013/0027815 A1* | 1/2013 | Gaknoki et al. | 361/18 |

OTHER PUBLICATIONS

Waldir Po and Wilson Komatsu, *A Simple and Reliable Class E Inverter for Induction Heating Applications*, Int. J. Electronics, 1998, vol. 84, No. 2, pp. 157-165.

\* cited by examiner

POWER CONVERTER WITH TANK CIRCUIT AND OVER-VOLTAGE PROTECTION

BACKGROUND

The present application claims the benefit of and priority to a pending provisional application entitled "Over-Voltage Protected Class E Converter," Ser. No. 61/635,664 filed on Apr. 19, 2012. The disclosure in this pending provisional application is hereby incorporated fully by reference into the present application. The present application also claims the benefit of and priority to a pending provisional application entitled "Over-Voltage Protected Class E Power Converter," Ser. No. 61/652,091 filed on May 25, 2012. The disclosure in this pending provisional application is also hereby incorporated fully by reference into the present application.

I. Definitions

As used herein, the phrase "group III-V" refers to a compound semiconductor that includes a group V element and at least one group III element. Moreover, the phrase "III-Nitride" or "III-N" refers to a compound semiconductor that includes nitrogen (N) and at least one group III element, including aluminum (Al), gallium (Ga), indium (In), and boron (B), and including but not limited to any of its alloys, such as aluminum gallium nitride ($Al_xGa_{(1-x)}N$), indium gallium nitride ($In_yGa_{(1-y)}N$), aluminum indium gallium nitride ($Al_xIn_yGa_{(1-x-y)}N$), gallium arsenide phosphide nitride ($GaAs_aP_bN_{(1-a-b)}$), and aluminum indium gallium arsenide phosphide nitride ($Al_xIn_yGa_{(1-x-y)}As_aP_bN_{(1-a-b)}$), for example. III-Nitride also refers generally to any polarity including but not limited to Ga-polar, N-polar, semi-polar or non-polar crystal orientations. A III-Nitride material may also include either the Wurtzitic, Zincblende, or mixed polytypes, and may include single-crystal, monocrystalline, polycrystalline, or amorphous structures. Gallium nitride or GaN, as used herein, refers to a III-Nitride compound semiconductor wherein the group III element or elements include some or a substantial amount of gallium, but may also include other group III elements in addition to gallium.

Also as used herein, the phrase "group IV" refers to a semiconductor that includes at least one group IV element including silicon (Si), germanium (Ge), and carbon (C), and may also include compound semiconductors SiGe and silicon carbide (SiC), amongst others. Group IV also refers to semiconductor materials which consist of layers of group IV elements or doping of group IV elements to produce a strained group IV material, and also includes group IV based composite substrates including silicon-on-insulator (SOI) substrates, silicon-on-sapphire (SOS) substrates, and separation by implantation of oxygen (SIMOX) substrates, amongst others.

II. Background Art

Power converters, such as class-E power converters, are utilized in a variety of high and low voltage applications. For example, because class-E power converters offer high efficiency, generate small switching losses, and typically display relative immunity to component tolerances, they may be utilized as power converters in induction heating (IH) and lighting applications.

Due to the advantages described above, IH cooktops utilizing class-E power converters enjoy considerable popularity. However, conventional class-E power converters are designed for use with stable power sources, which may not be consistently available everywhere IH cooktops utilizing class-E power converters are presently in use. For example, voltage transients can cause mains power to fluctuate substantially from nominal values, exposing the power switch or switches typically implemented as part of a class-E power converter to over-voltage induced damage or failure.

SUMMARY

The present disclosure is directed to a power converter with over-voltage protection, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, class-E power converters advantageously offer high efficiency, generate small switching losses, and typically display relative immunity to component tolerances. Due to these advantages, class-E power converters may be implemented in a variety of high and low voltage applications. Examples of such applications include step-down power conversion, induction heating (IH), and lighting applications. Moreover, because energy efficiency is one of the main objectives for IH cooking appliances, for example, class-E power converters are often utilized to limit converter switching losses and to reduce generation of electromagnetic interference (EMI).

The present application discloses power converters including a closed loop current-mode control solution providing over-voltage protection. In one implementation, a class-E power converter includes a current sensing control circuit configured to provide a signal for turning a power switch of the power converter OFF when a current from a tank circuit reaches a threshold value. As a result, implementations of the present inventive concepts provide a class-E power converter that is robust, reliable, and resistant to over-voltage induced damage, even when supplied by an unstable or otherwise variable power source. In the interests of conceptual clarity, the present concepts will be described by reference to a specific implementation of a class-E power converter configured for use in IH cooking. However, it is emphasized that such an implementation is merely exemplary, and the inventive principles disclosed herein are broadly applicable to a wide range of low voltage as well as high voltage power converter designs.

Figure 1:
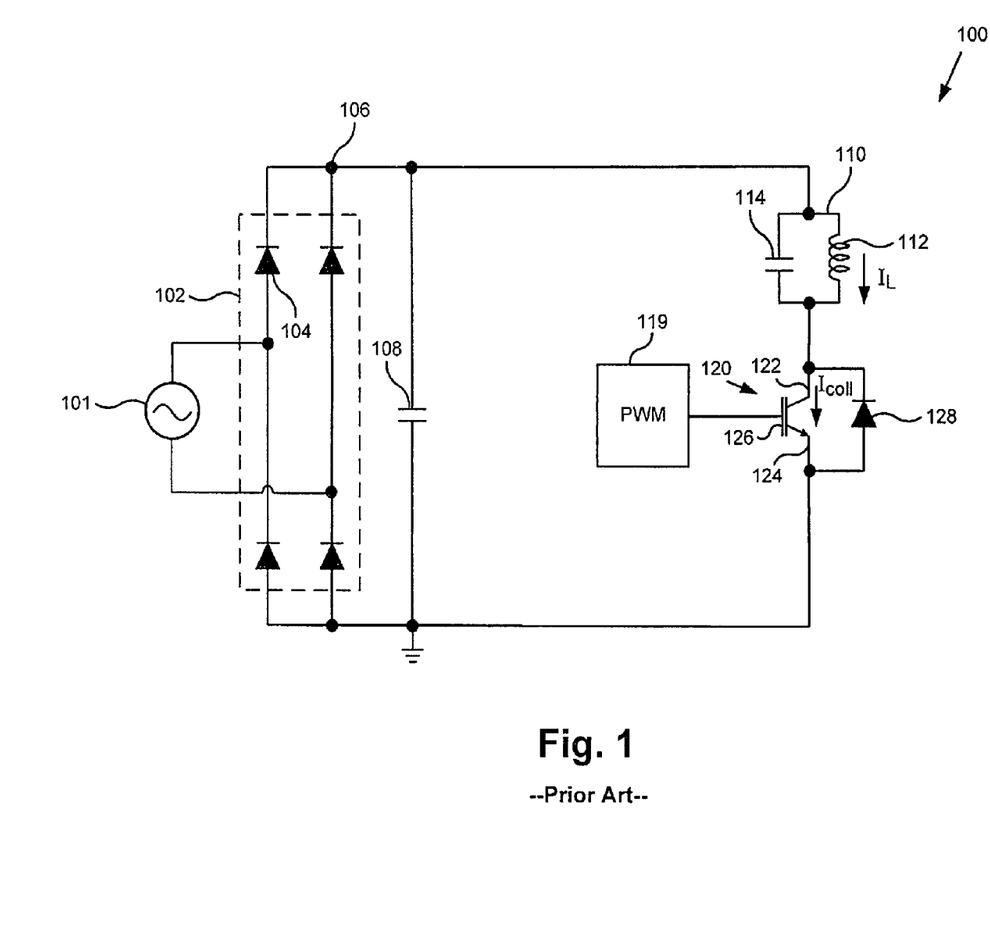
FIG. 1 shows a conventional class-E power converter used in induction heating (IH) applications.

FIG. 1 shows a diagram of a class-E power converter implemented using a conventional single ended parallel resonant (SEPR) converter design, as known in the art. Power converter 100 includes tank circuit 110 having inductor 112 and capacitor 114 arranged in parallel, as well as power switch 120, shown as an insulated-gate bipolar transistor (IGBT) having collector 122, emitter 124, and gate 126. In addition, power converter 100 includes antiparallel diode 128 having an anode coupled to emitter 124 and a cathode coupled to collector 122 of power switch 120, and PWM 119 coupled to gate 126 of power switch 120 for controlling the on-time of power switch 120.

As further shown by FIG. 1, power converter 100 also includes rectifier circuit 102 having rectifying diodes 104, with an exemplary rectifying diode 104 explicitly identified as such, power supply node 106, and filter capacitor 108 placed so as to act as an EMI filter and to provide a path, together with antiparallel diode 128, for resonant current flow. Also shown in FIG. 1 is alternating current (AC) mains power source 101 providing power for power converter 100. It is noted that the primary power source for power converter 100 is the rectified line voltage from mains power source 101 provided by rectifier circuit 102 at power supply node 106.

Figure 2:
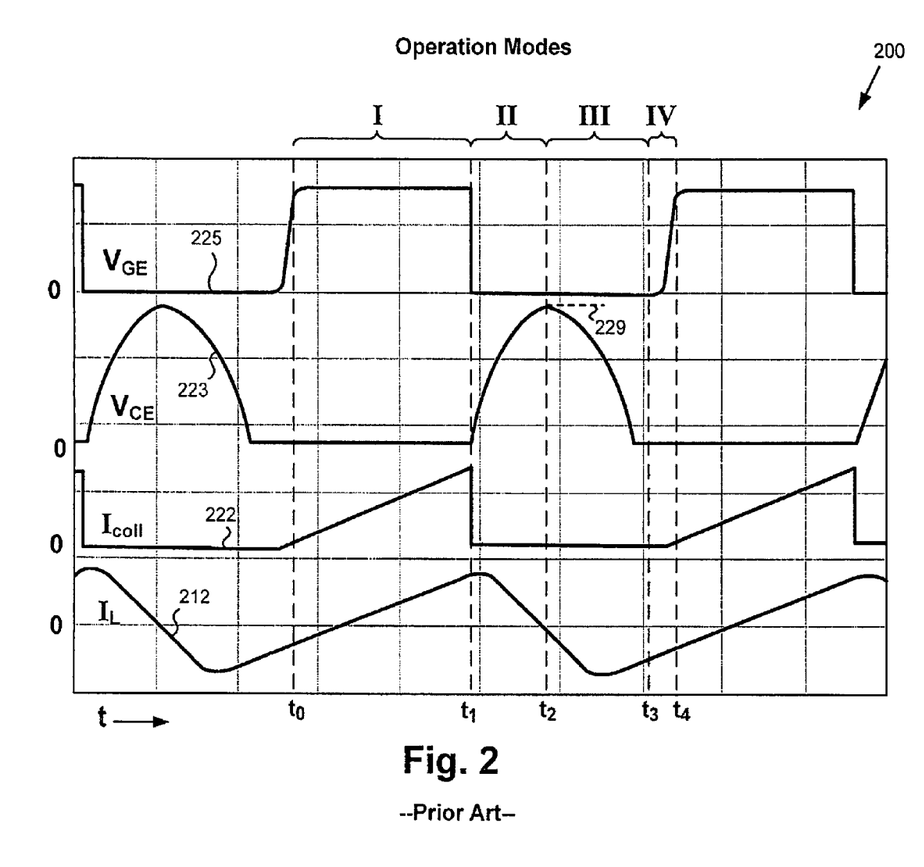
FIG. 2 shows a graph of waveforms corresponding to typical current and voltage values during operation of the class-E power converter of FIG. 1.
Figure 3:
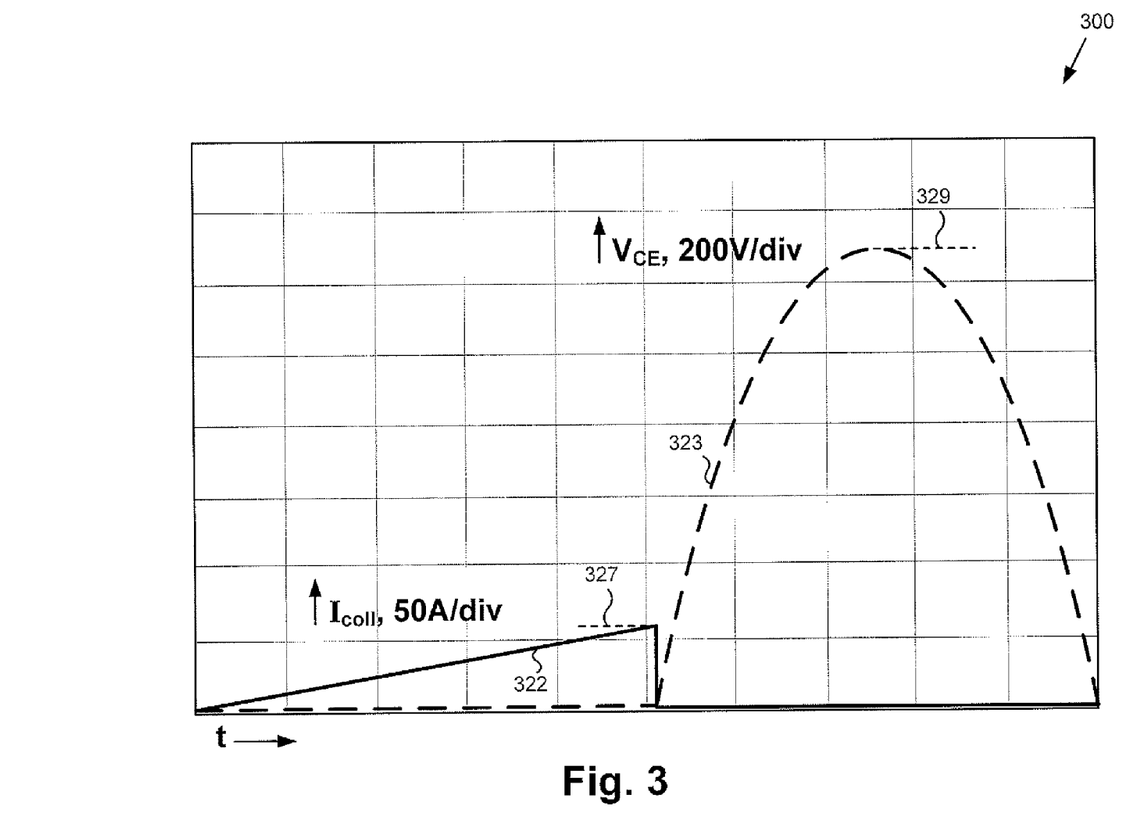
FIG. 3 is a graph showing the correspondence between collector current and collector-to-emitter voltage for the power switch utilized in the class-E power converter of FIG. 1.

For power levels close to two kilowatts (2.0 kW), and for a typical IH cooktop design, voltages up to approximately twelve hundred volts (1250 V) and peak currents close to sixty amperes (60 A) should be supported by power converter 100. A selectably fixed switching frequency control scheme implemented using PWM 119 is typically utilized to control power switch 120, operating from approximately twenty kilohertz to approximately sixty kilohertz. The operation of power converter 100 under such conditions will be further described by reference to FIGS. 2 and 3. FIG. 2 shows exemplary waveforms corresponding to typical current and voltage values for conventional class-E power converter 100, while FIG. 3 is a graph showing the correspondence between collector current ($I_{coll}$) and collector-to-emitter voltage ($V_{CE}$) for power switch 120.

Referring to FIG. 2, graph 200 shows exemplary waveforms of gate-to-emitter voltage ($V_{GE}$) 225, collector-to-emitter voltage $V_{CE}$ 223, and collector current $I_{coll}$ 222 of power switch 120, in FIG. 1, as well as the inductor current ($I_L$) 212 through inductor 112, during operation modes I, II, III, and IV. It is noted that FIG. 2 shows the flow of inductor current $I_L$ 212 during a full operating cycle of power converter 100.

Beginning with operation mode I during the time interval $t_0$ to $t_1$, power switch 120 is turned ON under zero voltage switching (ZVS) condition at $t_0$, as shown by $V_{GE}$ 225. That is to say, power switch 120 is turned ON when $V_{CE}$ and/or a current through power switch 420 (i.e., $I_{coll}$) is at a substantially minimum value close to zero. As a result, current $I_L$ 212 flows through inductor 112 from the rectified line voltage at power supply node 106, resulting in a rising collector current $I_{coll}$ 222 during operation mode I. During operation mode II in the time interval $t_1$ to $t_2$, power switch 120 is turned OFF at $t_1$, causing collector current $I_{coll}$ 222 to fall to substantially zero, while inductor current $I_L$ 212 starts to flow through capacitor 114, as shown by the rise in $V_{CE}$ 223 beginning at $t_1$. When the total inductor energy is transferred, the maximum resonant voltage is present on capacitor 114, and, therefore, power switch 120 is blocking the maximum $V_{CE}$ ($V_{CEpeak}$ 229).

During operation mode III in time interval $t_2$ to $t_3$, capacitor 114 resonates and current $I_L$ 212 flows through inductor 112 in the opposite direction. In operation mode IV during time interval $t_3$ to $t_4$, current flows through filter capacitor 108 and antiparallel diode 128. It is typically during this time that $V_{GE}$ 225 is applied to power switch 120 (i.e., under ZVS condition). When the total inductor energy is stored on filter capacitor 108, power switch 120 starts conducting, turning ON at time $t_4$, and the process described above is repeated.

For power converter 100, in FIG. 1, there is a direct interdependence between the maximum achievable output power level and $V_{CEpeak}$ 229 blocked by power switch 120. Any increase in the input voltage provided by mains power source 101 will increase the output power and hence $V_{CEpeak}$ 229. Consequently, the voltage rating of power switch 120 can be defined based on maximum stress levels, which are anticipated by the peak of the rectified line voltage as shown in FIG. 3. Thus, as revealed by graph 300, for a peak collector current ($I_{coll-peak}$) 327 of approximately 60 A, power switch 120 must be rated to sustain $V_{CEpeak}$ 329 of greater than 1200 V, such as $V_{CEpeak}$ 329 of approximately 1250 V.

However, the preceding estimate for the voltage tolerance required of power switch 120 is predicated on the assumption that mains power source 101 reliably provides a stable supply voltage at power supply node 106. As noted above, however, that is often not the case for the electrical supply infrastructures, where mains voltage transients can fluctuate up to approximately twenty percent (20%) from nominal values. As a result, $V_{CEpeak}$ 329 applied to power switch 120 in conventional power converter 100 may substantially exceed 1250 V, resulting in damage to power switch 120. Consequently, failure of power converter 100 due to damage of power switch 120 by voltage transients in mains power source 101 represents a significant problem in the conventional art.

Figure 4:
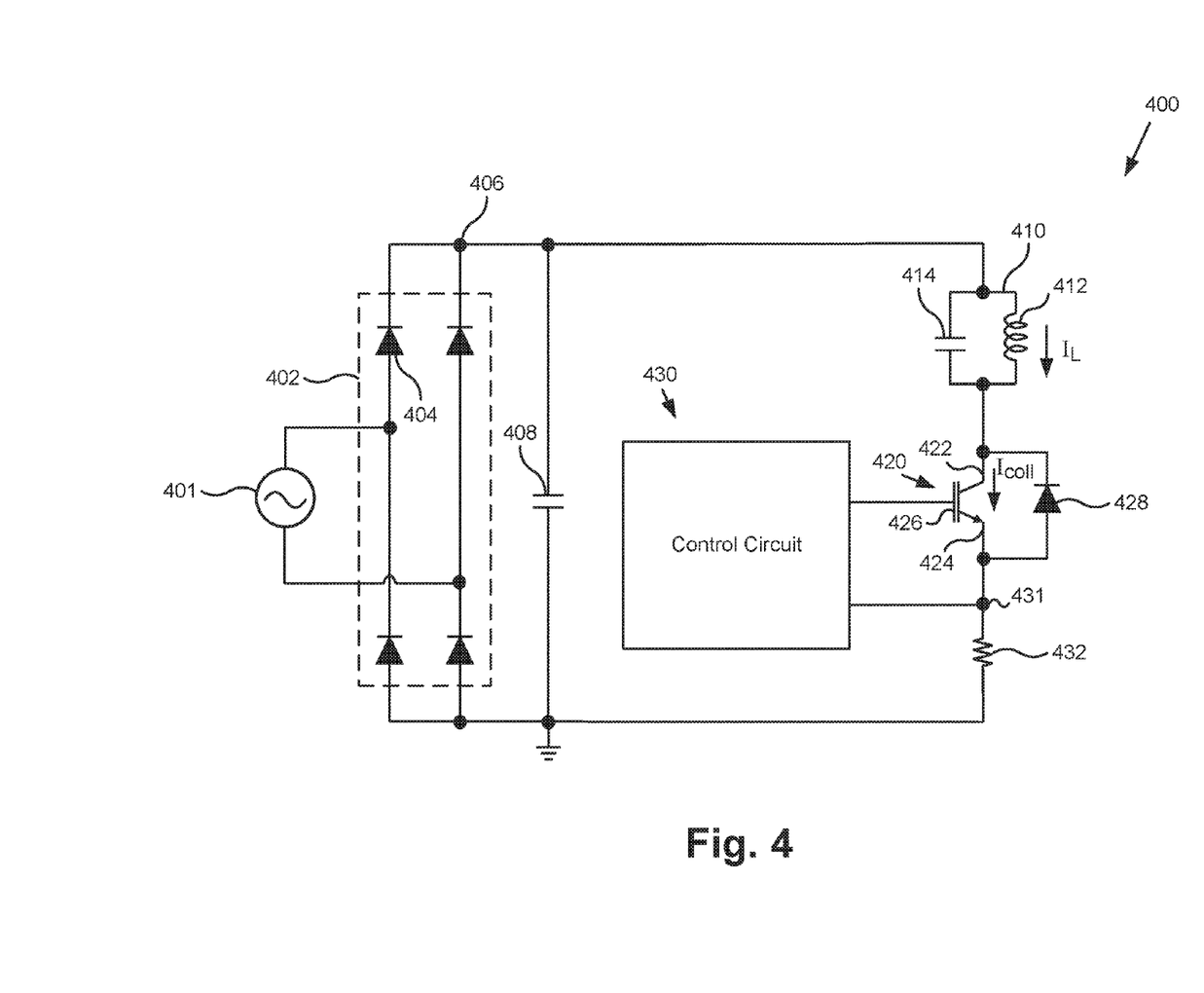
FIG. 4 shows an exemplary class-E power converter including a control circuit providing over-voltage protection, according to one implementation.

Referring now to FIG. 4, FIG. 4 shows a diagram of one exemplary implementation of a class-E power converter suitable for use as a SEPR power converter, according to the principles disclosed by the present application. Power converter 400 includes tank circuit 410 having inductor 412 and capacitor 414 arranged in parallel, as well as power switch 420, which is shown as an IGBT such as a silicon or other group IV IGBT having collector 422, emitter 424, and gate 426. In addition, power converter 400 includes antiparallel diode 428 having an anode coupled to emitter 424 and a cathode coupled to collector 422 of power switch 420.

As further shown by FIG. 4, power converter 400 also includes rectifier circuit 402 having rectifying diodes 404, with an exemplary rectifying diode 404 explicitly identified as such, power supply node 406, and filter capacitor 408 placed so as to act as an EMI filter and to provide a path, together with antiparallel diode 428, for resonant current flow through tank circuit 410. Also shown in FIG. 4 is AC mains power source 401 providing power for power converter 400.

Rectifier circuit 402 is coupled to AC mains power source 401 to provide a power supply for tank circuit 410 at power supply node 406. In addition, power switch 420 is coupled to power supply node 406 through tank circuit 410. Furthermore, power converter 400 includes sense resistor 432 coupled in series between emitter 424 of power switch 420 and ground. According to the exemplary implementation shown in FIG. 4, power converter 400 also includes control circuit 430 coupled to sense resistor 432 at node 431, and further coupled to gate 426 of power switch 420.

It is reiterated that although the class-E power converter depicted by power converter 400 is suitable for use as part of an IH cooktop, such an implementation is merely exemplary. As noted above, the inventive principles disclosed herein are more broadly applicable to a wide range of low voltage as well as high voltage class-E power converters for use, by way of example, in step-down power conversion and light-emitting diode (LED) or other lighting applications.

It is further noted that, although the present implementation depicts power switch 420 as a group IV IGBT, in other implementations, power switch 420 may take the form of any suitable switching device, such as a group IV metal-oxide-semiconductor field-effect transistor (MOSFET), or a group IV bipolar junction transistor (BJT). Moreover, in some implementations, power switch 420 may take the form of a group III-V heterostructure FET (HFET), such as a III-Nitride or other group III-V high electron mobility transistor (HEMT), for example.

In contrast to conventional power converter 100, in FIG. 1, which utilizes PWM 119 to implement an open loop switching control scheme susceptible to over-voltage damage due to fluctuations in mains power source 101, exemplary power converter 400 is effectively immune to such power supply unreliability. In one implementation, power converter 400 is configured to utilize control circuit 430 to turn power switch 420 OFF based on a current from tank circuit 410, thereby providing over-voltage protection to power switch 420. That is to say, power converter 400 is configured to utilize control circuit 430 and sense resistor 432 to sense a current from tank circuit 410, i.e., $I_{coil}$ flowing through power switch 420, and to turn power switch 420 OFF when $I_{coil}$ reaches a threshold value. In other words, power converter 400 is configured to utilize control circuit 430 and sense resistor 432 to receive feedback corresponding to the current from tank circuit 410, and to turn power switch 420 OFF based on that feedback. As a result, power converter 400 implements a closed loop current-mode switching control regime that is responsive to fluctuations in the voltage provided by mains power source 401.

For example, control circuit 430 may include sensing circuitry such as a comparator (not shown in FIG. 4) configured to compare the voltage drop across sense resistor 432 with a reference voltage, and to produce a control signal for turning power switch 420 OFF when the reference voltage is met or exceeded. By initiating turn OFF of power switch 420 based on the current from tank circuit 410, rather than according to a fixed time switching regime, implementations of the present class-E power converter including control circuit 430 and current sense resistor 432 assure that the $V_{CEpeak}$ applied to power switch 420 remains within the voltage tolerance of power switch 420.

Figure 5:
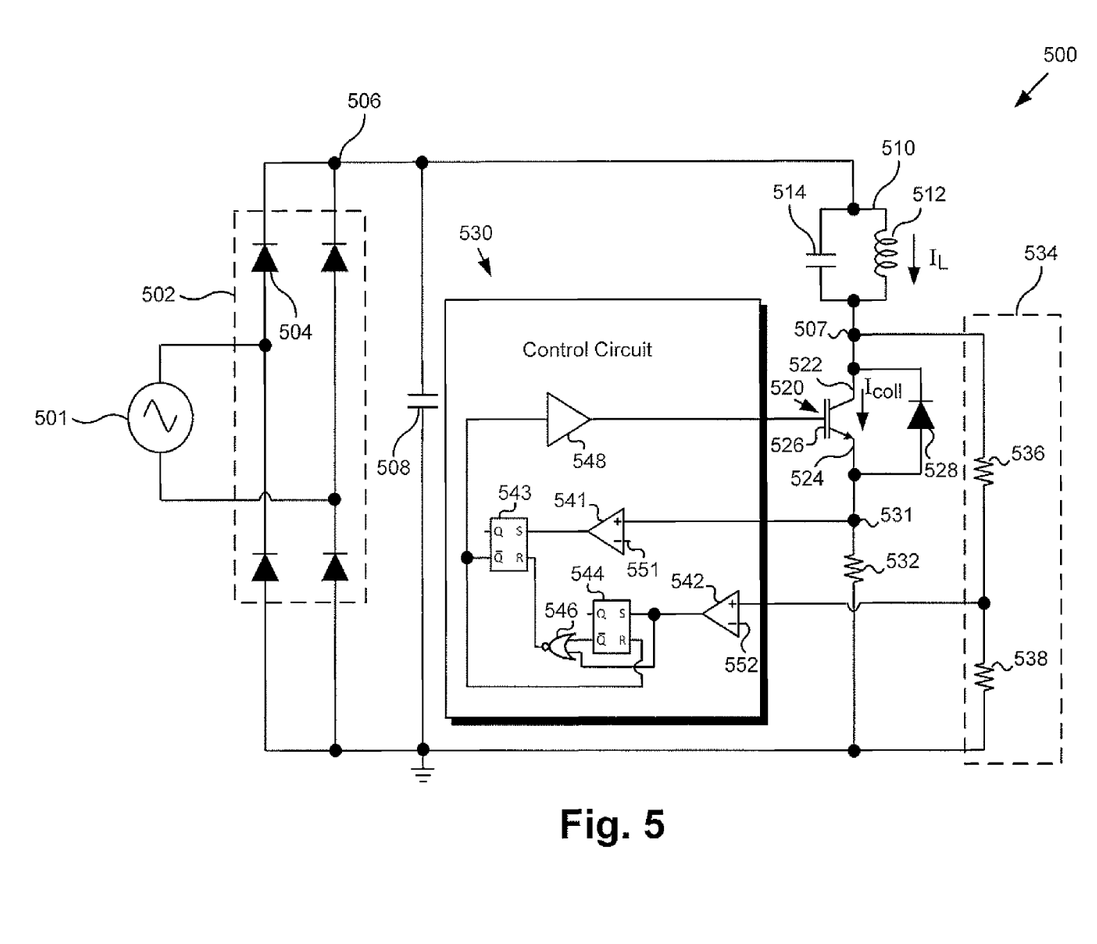
FIG. 5 shows an exemplary class-E power converter and includes a more detailed exemplary representation of a control circuit providing over-voltage protection, according to one implementation.

FIG. 5 shows an exemplary class-E power converter and includes a more detailed exemplary representation of control circuit 530 for providing over-voltage protection, according to one implementation. In addition to control circuit 530, power converter 500 includes tank circuit 510 having inductor 512 and capacitor 514 arranged in parallel, as well as power switch 520, shown as an IGBT having collector 522, emitter 524, and gate 526. Power converter 500 also includes antiparallel diode 528 having an anode coupled to emitter 524 and a cathode coupled to collector 522 power switch 520.

As further shown by FIG. 5, power converter 500 also includes rectifier circuit 502 having rectifying diodes 504, with an exemplary rectifying diode 504 explicitly identified as such, power supply node 506, and filter capacitor 508 placed so as to act as an EMI filter and to provide a path, together with antiparallel diode 528, for resonant current flow. Also shown in FIG. 5 are AC mains power source 501 providing power for power converter 500, nodes 507 and 531, and voltage divider 534 including resistors 536 and 538.

AC mains power source 501, rectifier circuit 502, power supply node 506, and filter capacitor 508, correspond respectively to AC mains power source 401, rectifier circuit 402, power supply node 406, and filter capacitor 408, in FIG. 4. In addition, tank circuit 510 including inductor 512 and capacitor 514, power switch 520, antiparallel diode 528, control circuit 530, and sense resistor 532 correspond respectively to tank circuit 410 including inductor 412 and capacitor 414, power switch 420, antiparallel diode 428, control circuit 430, and sense resistor 432, in FIG. 4, and may have any of the characteristics attributed to those corresponding features, above.

As shown in FIG. 5, control circuit 530 includes comparator 541 coupled to node 531 between emitter 524 of power switch 520 and sense resistor 532, and comparator 542 coupled to voltage divider 534, between resistors 536 and 538. In addition, control circuit 530 includes two SR-type flip flops 543 and 544, NOR gate 546, and gate driver 548 for power switch 520. Also shown are reference voltages 551 and 552 of respective comparators 541 and 542.

Figure 6:
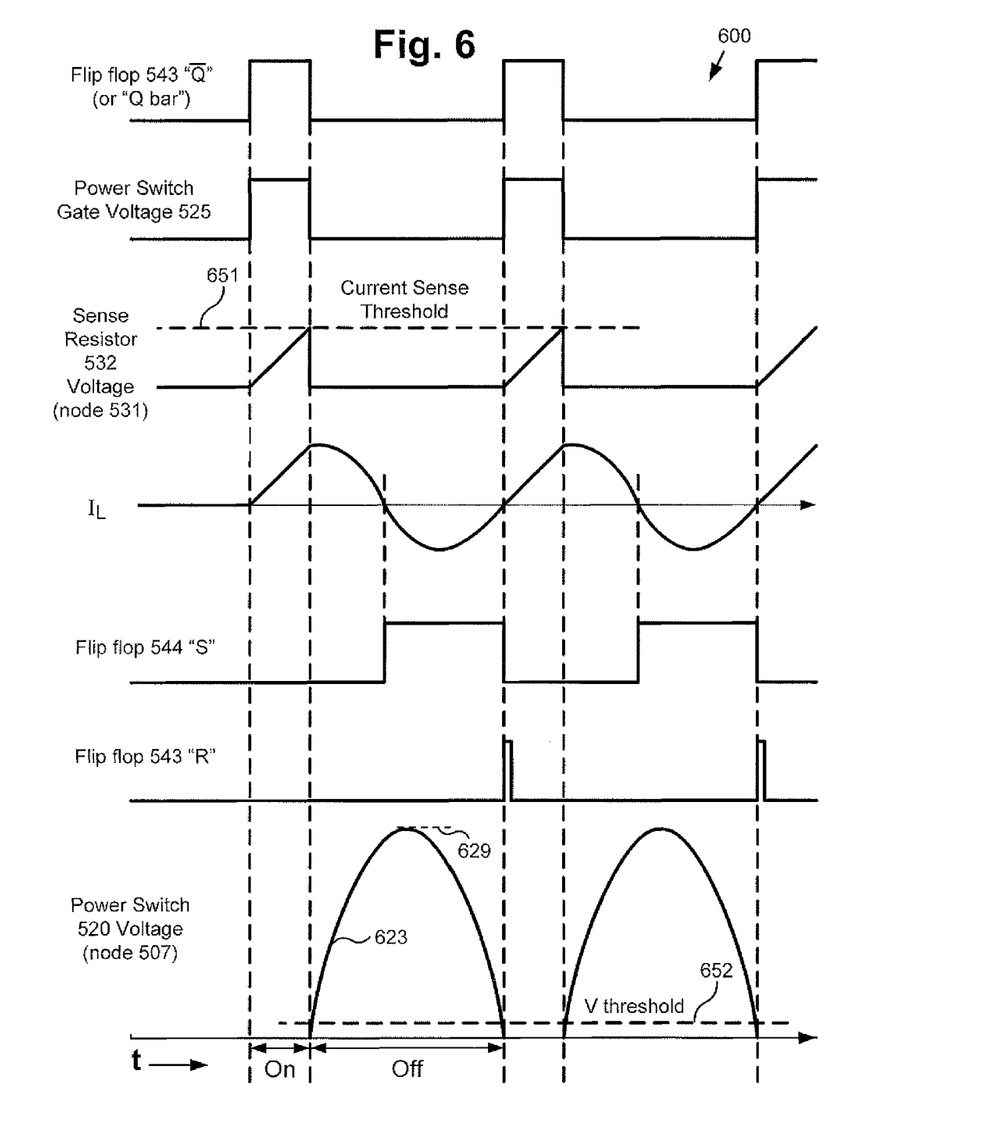
FIG. 6 shows a timing diagram displaying exemplary waveforms produced by the exemplary class-B power converter with over-voltage protection shown in FIG. 5.

FIG. 6 shows timing diagram 600 displaying exemplary waveforms produced during operation of power converter 500, in FIG. 5, to illustrate its turn-on and turn-off functionality. Initially, no power is applied to power converter 500 and power switch 520 is OFF. When a rectified line voltage at power supply node 506 is applied across filter capacitor 508, and voltage is supplied to control circuit 530, flip flop 543 "S" is LOW and flip flop 543 "Q bar" is HIGH. As a result, gate driver 548 takes gate 526 of power switch 520 HIGH, turning power switch 520 ON. This is the start of the on-time period of power switch 520. Current flows from power supply node 506, through inductor 512 as $I_L$, through power switch 520 as $I_{coil}$, and through sense resistor 532 to ground.

As current flows in the manner described, the voltage across sense resistor 532 ramps up and is measured at node 531. When that voltage reaches current sense threshold voltage 651 corresponding to reference voltage 551 of comparator 541, the output of comparator 541 goes HIGH, and flip flop 543 "S" goes HIGH as well. This causes flip flop 543 "Q bar" to go LOW. As a result, gate driver 548 takes gate 526 of power switch 520 LOW, turning power switch 520 OFF. This is the end of the on-time period of power switch 520 and the start of the off-time period of power switch 520.

As shown in FIG. 6, inductor current $I_L$ flows positively and negatively with a quasi-sinusoidal shape. The voltage across power switch 520, as measured at node 507, rises from substantially zero to $V_{CEpeak}$ 629, and falls to substantially zero again. Comparator 542 senses when the voltage at node 507 (as measured through voltage divider 534 formed by resistors 536 and 538) has increased above, and has then fallen below a predetermined voltage threshold 652 corresponding to reference voltage 552 of comparator 542. Those transitions above and then below voltage threshold 652 cause the output of comparator 542 to first go HIGH when the voltage at node 507 rises to voltage threshold 609, and then to go LOW when the voltage at node 507 subsequently falls below voltage threshold 652. That, in turn, cause flip flop 544 "S" to toggle HIGH and then LOW as well.

When the flip flop 544 "S" is HIGH, flip flop 544 "Q bar", providing one of the inputs to NOR gate 546 is LOW. A second input to NOR gate 546 is HIGH due to being tied to flip flop 544 "S". This produces a LOW at the output of NOR gate 546. When flip flop 544 "S" subsequently goes LOW, the output of NOR gate 546 goes momentarily HIGH and then LOW again as flip flop 544 "Q bar" goes HIGH. The resulting pulse produced at the output of NOR gate 546 is received at flip flop 543 "R" and resets flip flop 543. This signals the end of the off-time period of power switch 520. Flip flop 543 "Q bar" then goes HIGH once again, gate driver 548 takes the voltage at gate 526 of power switch 520 HIGH again, and power switch 520 turns ON. The on-time period of power switch 520 starts once again and inductor current $I_L$ ramps up again, causing collector current $I_{coll}$ to ramp up through power switch 520.

The on-time of power switch 520 is controlled by current sense threshold voltage 651. Consequently, the current through sense resistor 532 ramps up to a fixed level each on-time period. The current then discharges into capacitor 514 during the off-time, causing the voltage across power switch 520 (as measured by the voltage at node 507) to increase to $V_{CEpeak}$ 629. $V_{CEpeak}$ 629 is directly determined by the peak current level of collector current I a $I_{coll}$ ($I_{coll-peak}$) reached during the on-time. Consequently, if the peak current through inductor 512 is controlled during the on-time, $V_{CEpeak}$ 629 is effectively controlled during the off-time.

Conventional control schemes for power switch 520 typically include direct PWM control (e.g., open-loop control) of the on-time of power switch 520, without control of the peak current, as shown and described by reference to power converter 100 including PWM 119 and power switch 120, in FIG. 1. The disadvantage of such an open-loop PWM control method is that if the voltage at power supply node 506 should increase due to a mains voltage surge or transient condition, current $I_L$ through inductor 512 during the on-time will also increase, and the voltage across power switch 520 can increase to a very high level (e.g., 2000 V for a power switch rated for operation at a peak of approximately 1250 V).

Such a high voltage level can exceed the maximum voltage rating of power switch 520 and cause power switch 520 to be damaged or to fail, as noted above. The closed-loop current-mode control solution described herein limits current $I_L$ through inductor 512 to a fixed level during each on-time period. This means that $V_{CEpeak}$ 629 will be effectively capped during the off-time. Thus, if the voltage at power supply node 506 increases, current $I_L$ through inductor 512 will still be limited to a desirable level and the voltage across power switch 520 will not increase beyond tolerance. In this way, $V_{CEpeak}$ 629 can be maintained safely below the maximum voltage rating of power switch 520 and is therefore a more reliable and robust solution for power converter 500. Moreover, the current sense threshold voltage 651 can be adjusted to control the amount of current in the circuit (e.g., to set the amount of desired heating for IH cooking applications) and can be limited to a maximum level to ensure that the voltage across power switch 520 stays below the maximum allowable rating at all times.

Although not explicitly shown by the present figures, another possible implementation for power converter 500 situates capacitor 514 between collector 522 and emitter 524 of power switch 520, instead of in parallel with inductor 512. In this alternative implementation, the same closed loop current-mode control circuit 530 and waveforms shown in FIG. 6 can apply, with only the location of capacitor 514 being changed.

The type of class-E power converter represented by FIGS. 4 and 5 can be used in many different types of switched-mode converters including AC-DC and DC-DC applications. The same current-mode control circuit described herein can be used in each of these different applications as a general method for limiting the peak voltage across the power switch. Thus, the present application discloses a class-E power converter that is robust, reliable, and resistant to over-voltage induced damage even when powered by an unstable or otherwise variable power source.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

The invention claimed is:

1. A power converter with over-voltage protection, the power converter comprising:
    a power switch coupled to a power supply through a tank circuit, the tank circuit including an inductor and a capacitor coupled in parallel with each other, between the power supply and the power switch;
    a control circuit coupled to a gate of the power switch;
    a first sense resistor coupled in series with the power switch between a first load path terminal of the power switch and ground; and,
    a second sense resistor coupled between a second load path terminal of the power switch and ground, wherein the control circuit is configured to
        turn the power switch OFF based on a voltage across the first sense resistor, and
        turn the power switch ON based on a voltage across the second sense resistor.

2. The power converter of claim 1, wherein the control circuit is configured to turn the power switch ON when the voltage across the second sense resistor is substantially zero.

3. The power converter of claim 1, wherein the power converter is a class-E power converter.

4. The power converter of claim 1, wherein the power switch comprises a group IV insulated-gate bipolar transistor (IGBT).

5. The power converter of claim 1, wherein the power switch comprises a group IV bipolar junction transistor (BJT).

6. The power converter of claim 1, wherein the power switch comprises a group IV metal-oxide-semiconductor field-effect transistor (MOSFET).

7. The power converter of claim 1, wherein the power switch comprises a group III-V heterostructure field-effect transistor (HFET).

8. The power converter of claim 1, wherein the power converter is part of an induction heating (IH) cooktop.

9. A power converter with over-voltage protection, the power converter comprising:
- a rectifier circuit coupled to an alternating current (AC) source to provide a power supply for a tank circuit;
- a power switch coupled to the power supply through the tank circuit, the tank circuit including an inductor and a capacitor coupled in parallel with each other, between the power supply and the power switch;
- a sense resistor coupled in series with the power switch between a first load path terminal of the power switch and ground;
- a voltage divider electrically coupled between a second load path terminal of the power switch and ground; and
- a control circuit configured to receive feedback from the sense resistor and from the voltage divider, wherein the control circuit is configured to
    - turn the power switch OFF when a current through the sense resistor reaches a predetermined current threshold, and
    - turn the power switch ON when a voltage of the voltage divider is below a predetermined voltage threshold.

10. The power converter of claim 9, wherein the control circuit is configured to turn the power switch ON when a current through the power switch is substantially zero.

11. The power converter of claim 9, wherein the power converter is a class-E power converter.

12. The power converter of claim 9, wherein the control circuit is configured to sense the current from the tank circuit based on a voltage drop across the sense resistor.

13. The power converter of claim 9, wherein the power switch comprises a group IV insulated-gate bipolar transistor (IGBT).

14. The power converter of claim 9, wherein the power switch comprises a group IV bipolar junction transistor (BJT).

15. The power converter of claim 9, wherein the power switch comprises a group IV metal-oxide-semiconductor field-effect transistor (MOSFET).

16. The power converter of claim 9, wherein the power switch comprises a group III-V heterostructure field-effect transistor (HFET).

17. The power converter of claim 9, wherein the power converter is part of an induction heating (IH) cooktop.

18. The power converter of claim 9, wherein the voltage divider comprises a resistive voltage divider.

19. A power converter comprising:
- a resonant tank coupled between a supply terminal and a first load path terminal of a power transistor;
- a first sense resistor coupled between a second load path terminal of the power transistor and ground;
- a second sense resistor coupled between the first load path terminal and ground; and
- a control circuit coupled to a gate of the power transistor, the control circuit configured to
    - turn off the power transistor when a voltage across the first sense resistor is higher than a first reference voltage, and
    - turn on the power transistor when a voltage across the second sense resistor is lower than a second reference voltage.

20. The power converter of claim 19, wherein the control circuit comprises:
- a first comparator coupled to the first sense resistor;
- a second comparator coupled to the second sense resistor; and
- a first flip-flop with inputs coupled to the first comparator and the second comparator and an output coupled to the gate of the power transistor.

21. The power converter of claim 19, further comprising the power transistor.

* * * * *